United States Patent [19]

Bartholomew et al.

[11] Patent Number: 5,151,117
[45] Date of Patent: Sep. 29, 1992

[54] SOLUTION DOPING OF POROUS PREFORMS

[75] Inventors: Roger F. Bartholomew, Painted Post; Andrea L. Sadd, Corning, both of N.Y.

[73] Assignee: Corning Incorporated, Corning, N.Y.

[21] Appl. No.: 715,348

[22] Filed: Jun. 14, 1991

[51] Int. Cl.$^5$ ............................................. C03C 25/02
[52] U.S. Cl. ..................................... 65/3.12; 65/18.2; 65/901; 65/60.3; 65/30.13; 264/1.5; 501/37
[58] Field of Search ..................... 65/3.12, 3.11, 3.14, 65/30.13, 18.2, 60.3, 901; 264/1.5, 2.7; 501/37, 64

[56] References Cited

U.S. PATENT DOCUMENTS

| | | | |
|---|---|---|---|
| 3,859,073 | 1/1975 | Schultz | 65/60 |
| 4,110,096 | 8/1978 | Macedo | 65/31 |
| 4,141,710 | 2/1979 | Aulich | 425/165 |
| 4,183,620 | 1/1980 | Macedo et al. | 65/31 |
| 4,225,330 | 9/1980 | Kakuzen | 65/32 |
| 4,299,608 | 11/1981 | Macedo | 65/3.1 |
| 4,302,231 | 11/1981 | Macedo et al. | 65/31 |
| 4,336,049 | 6/1982 | Takahashi et al. | 65/18.2 |
| 4,414,012 | 11/1983 | Suto et al. | 65/18.2 |
| 5,047,076 | 9/1991 | Cognolato et al. | 65/3.12 |

FOREIGN PATENT DOCUMENTS 61-36130 2/1986 Japan.
63-45143 2/1988 Japan.

Primary Examiner—W. Gary Jones
Assistant Examiner—John J. Bruckner
Attorney, Agent, or Firm—William J. Simmons, Jr.

[57] ABSTRACT

Disclosed is a method of forming a doped glass body. The glass body is formed by adding a dopant to a glass preform, at least part of which has interconnective pores. The porous preform is immersed in a solution of a salt of the dopant dissolved in an organic solvent having no OH groups. The solvent is removed, and the porous glass preform is heat treated to consolidate it into a non-porous glassy body containing the dopant dispersed throughout at least a portion of the body. An OH-free solvent is selected because of its beneficial effect on the preform during the drying step. Whereas OH-containing solvents such as water and alcohol caused cracking and/or flaking of the outer surface of the porous preform following the drying step, an undamaged surface is formed by the present invention.

10 Claims, 1 Drawing Sheet

SOLUTION DOPING OF POROUS PREFORMS

BACKGROUND OF THE INVENTION

The present invention relates to the formation of optical fiber preforms by the solution doping of porous glass.

Optical fibers have been routinely fabricated on a commercial basis with losses less than 1 dB/km in at least part of the optical region of the spectrum, generally extending from 0.7 to 1.7 microns. The fibers comprise a core and a cladding, with the cladding having an index of refraction lower, at least in part, than that of an index of refraction associated with the core. Such low loss optical fibers are formed of glass comprising primarily silica, i.e. the glass composition comprises more than 50% silica.

Dopants which are used to make optical fibers include germania, an index raising dopant, which is the principal and most widely used dopant, as well as other minor dopants, such as phosphorus, and other index raising dopants, and fluorine and boron, index lowering dopants. Other dopants considered for use in optical fibers include Al, Zr, Nb, Ta, Ga, In, Sn, Sb, Bi, the 4f rare earths (atomic numbers 57-71), and the alkaline earths Be, Mg, Ca, Zn, Sr, Cd, and Ba. Of these, certain rare earth-doped optical fibers are of interest for a variety of applications including fiber lasers, attenuators and sensors.

Optical fibers are normally made by the oxidation of metal chlorides. Chlorides are conventionally used because they can be vaporized at relatively low temperatures and delivered to a hot zone where they are oxidized. By "hot zone" is meant that region of a glass preform forming apparatus where glass forming reactant vapors are oxidized; it can include, for example, a region within a burner flame or a heated region within a substrate tube. Vaporization techniques typically used for silicon tetrachloride and germanium tetrachloride include bubbling, direct vaporization and flash vaporization. Other chlorides that have been used commercially include boron and phosphorus chlorides which are also liquid or gaseous at room temperature. There are however several other metal chlorides that could be used in optical waveguides that are solids at room temperature and may or may not sublime rather than boil. These properties make it nearly impossible to deliver these materials with conventional systems.

Solution doping techniques have been employed for incorporating into glass preforms dopants which are not easily delivered to the reaction zone or which cannot be incorporated in adequate quantity when introduced into the glass during its formation in the hot zone. See, for example, U.S. Pat. No. 3,859,073 (Schultz) and the publication: J. E. Townsend et al. "Solution-Doping Technique for Fabrication of Rare-Earth-Doped Optical Fibers", Electronics Letters, 26 Mar. 1987, vol. 23, No. 7, pp. 329-331. The Schultz patent relates to preforms formed by the so-called "outside process" in which a porous preform is deposited on the outer surface of a cylindrical mandrel. The Townsend et al. publication relates to the so-called "inside process" whereby a porous coating can be built up on the inner surface of a substrate tube.

In accordance with the aforementioned Schultz patent one or more reactant compounds are delivered in vapor form to a burner; they react in the flame to form glass particles that are deposited to form a porous preform having a network of continuous open pores throughout its mass. The particles within the preform must adhere to one another to a sufficient extent that they will not separate and cause the preform to disintegrate when it is in contact with liquid. At the same time, a network of continuous pores is required for effective impregnation by a dopant solution. Thus, the particles cannot be so densely packed as to interfere with liquid entry into the preform during impregnation. The Schultz patent teaches that porosity should be about 75% for optimum processing and that bodies having porosities within the range of 60-90% can be useful. As a general rule, pore diameter is said to be within the range of 10.0 and 0.001 microns. The porous preform is cooled and then immersed in a solution containing a dopant, whereby at least a portion of the pores is filled with dopant material which deposits as a solid in the pores. The porous preform is dried and heat treated to consolidate it into a non-porous glassy body containing the dopant. If the resultant glass article is to form the core or central portion of an optical fiber, it is provided with cladding material and drawn into a fiber. The cladding can be added by inserting the doped glass article into a cladding glass tube or by depositing additional cladding glass particles on the outer surface of the doped glass article.

Solution doping techniques have commonly employed aqueous or alcoholic solutions of the dopant compounds. Perhaps porous coatings formed by the inside process can withstand the effects of such solutions since the porous region is supported by an outer silica wall. However, when optical fiber preforms have been formed by processes including immersing porous preforms in an aqueous or alcoholic solution, the preforms have often been rendered useless due to either disintegration during immersion in the solvent or cracking of the outer layers of the preforms during drying. Larger preforms, which are preferred for use in commercial operations, exhibit a greater tendency to fracture during immersion in water or alcohol. Such damage may be caused by stress resulting from hydrogen bonding of the solvent to the silica surface which is of extremely large area in porous optical fiber preforms.

SUMMARY OF THE INVENTION

It is therefore an object of the present invention to provide a solution doping technique that does not detrimentally affect the porous glass preform that is being doped. Another object is to provide a method of making high silica content optical fibers containing more than trace amounts of certain dopants such as rare earth oxides which are not easily incorporated into the glass during its initial formation.

In accordance with this invention a glass body is formed by adding a dopant to a glass preform, at least part of which has interconnective pores. The porous preform is immersed in a solution of a salt of the dopant dissolved in an organic solvent primarily comprising a solvent having no OH groups. Preferred solvents are OH-free; acetone is particularly suitable because of its cost and availability. The solvent is removed, and the porous glass preform is heat treated to consolidate it into a non-porous glassy body containing the dopant dispersed throughout at least a portion of the body.

If the salt of the dopant does not dissolve in an OH-free solvent, the salt is first dissolved in as little OH-containing solvent as is required to dissolve the salt and form a preliminary solution. The OH-free solvent is then added to achieve the desired volume of final solution in which the porous preform can be immersed.

The method of the invention is particularly suitable for making optical fibers that are formed of a glass comprising primarily silica. In a preferred embodiment one or more reactant compounds are introduced into a flame where they are oxidized to form glass particles that are deposited on a support where they adhere together to form a porous glass preform. A dopant is added to the porous glass preform by immersing it in a solution of a salt of the dopant as described above. After the solvent is removed and the porous glass preform is consolidated into a non-porous glassy body containing the dopant dispersed throughout at least a portion thereof, an optical fiber is formed from the glass body.

Prior to the fiber drawing step, the glass body can be provided with additional cladding glass. This can be accomplished by depositing cladding glass particles on the glass body, for example. Prior to depositing the cladding glass particles on the glass body, it can be stretched to decrease its diameter.

DESCRIPTION OF THE PREFERRED EMBODIMENTS

Figure 1:
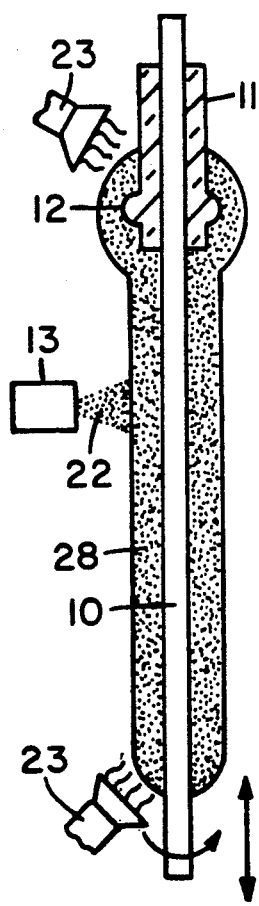
FIGS. 1 and 2 illustrate the application of successive coatings of glass particles to a mandrel.

The present method basically involves the following steps: (a) particle deposition, (b) impregnation, (c) solvent removal, and (d) consolidation. These steps result in the formation of a non-porous glassy body which contains, at least in part, the dopant supplied in the impregnation step. The glassy body is usually in the form of a cylinder which can be drawn directly into an optical fiber or which can be provided with additional material to form a draw blank that can be drawn into a fiber. The cylinder could be a rod that is inserted into a cladding glass tube, or it could be a tube into which a rod of core glass is inserted. In another embodiment, step (a) comprises depositing particles on the surface of a rod of core glass. After steps (b), (c) and (d) are performed, the resultant preform comprises the core glass rod surrounded by an adherent layer of dopant-containing glass. The preform can be directly drawn into a fiber, or additional layers can be deposited before the drawing step.

The particle deposition step can take the form of any process whereby heated glass particles are deposited to form an aggregation or deposit of particles that adhere together to form a porous glass coating having interconnective pores. The deposit is usually such that it will, after processing, form at least a part of an optical fiber. The particle deposition step is normally performed in accordance with the aforementioned outside or inside processes or in accordance with an axial process of the type disclosed in U.S. Pat. No. 4,224,046.

In accordance with a preferred embodiment of the present invention, the impregnation step comprises immersing the porous preform into a solution containing a salt of the dopant dissolved in an organic solvent which does not contain an OH group. Examples of such solvents are ketones such as acetone, methyl ethyl ketone, 3-pentanone and 2-pentanone, and aldehydes such as acetaldehyde and propionaldehyde. Microporous silica of the type produced by the above-described processes is extremely reactive due to its large surface area. It is thought that OH groups in solvents such as water and alcohol bond to the surfaces within the pores of such silica-containing preforms and that stress occurring as the doped preform dries is the cause of observed preform damage. It has been found that rare earth nitrates can be dissolved in such solvents to form the solution. The solubility of such an ionic material in an organic solvent was unexpected. Codoping can be practiced by employing more than one dopant compound in the solution. The level of dopant deposited in the preform, and thus in the final product, can be reliably determined by the concentration of the dopant compound in the solution.

Certain salts, such as aluminum nitrate, erbium chloride and aluminum chloride, do not dissolve directly in the OH-free solvent. Such salts do, however, dissolve in OH-containing solvents such as alcohol and water. A suitable solution can be formed by first dissolving such a salt in as little OH-containing solvent as is required to dissolve the salt; then the OH-free solvent is added to achieve the desired volume. For purposes of the present invention, the OH-containing solvent constitutes less than 30 volume % of the mixed solvent solution. Such mixed solvent solutions have been satisfactorily employed for doping porous glass preforms without damaging the preform during drying.

After the dopant solution has been introduced into the porous preform, the solvent is removed, thereby leaving a deposit of the dopant compound within the pores of the preform. Since the solvent is sufficiently volatile, drying can occur by simply removing the impregnated preform from the solution and supporting it in the open air for a sufficient time to permit the solvent to evaporate. To hasten the process, air, preferably warm air, can be blown across the surface of the preform. However, care must be taken to avoid uneven drying. This step leaves a deposit of the dopant compound within the pores of the preform.

The consolidation step involves heat treating the impregnated porous glass preform to fuse or consolidate it into a non-porous glassy body in which the dopant is at least in part dispersed. This step advantageously includes flowing a drying gas through the preform pores to dehydrate the glass particles prior to their complete consolidation.

The invention is further described with respect to a specific embodiment wherein a porous silica-containing preform is formed by the outside process.

An optical fiber core blank is formed by a method similar to that disclosed in U.S. Pat. No. 4,486,212 (Berkey) which is incorporated herein by reference. Referring to FIG. 1, the large diameter end of a tapered mandrel 10 is inserted into glass tube 11 having protrusions 12. Mandrel 10 is rotated and translated with respect to a burner 13 of the type disclosed in U.S. Pat. No. 4,165,223. Reactant compounds emanate from the burner where they are oxidized in the flame to form glass particle stream 22 which is directed toward mandrel 10. Auxiliary burners 23 direct flames toward the ends of the porous glass preform during deposition; the use of auxiliary burners is taught in U.S. Pat. No. 4,810,276 (Gilliland).

Figure 2:
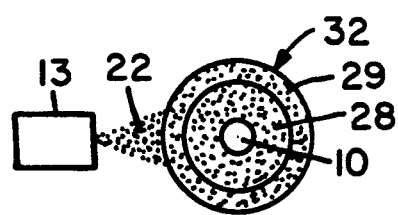

A porous core preform can be formed by simply depositing a coating 28 of core glass particles on mandrel 10. However, it is advantageous to also deposit a thin coating 29 of cladding glass particles on the surface of coating 28 as shown in FIG. 2. Each of the coatings 28 and 29 is formed by traversing the mandrel a number of times with respect to burner 13 to cause a build-up of a plurality of layers of glass particles. Additional burner passes can be made in the vicinity of protrusions 12 to strengthen the bond between the tube and preform.

Preform 32 is removed from the lathe, and the mandrel is removed through tube 11, thereby leaving a longitudinal aperture 31 in the porous preform. Protrusions 12 cause tube 11 to adhere to the preform; that tube remains at one end of the preform to provide support for subsequent processing.

Figure 3:
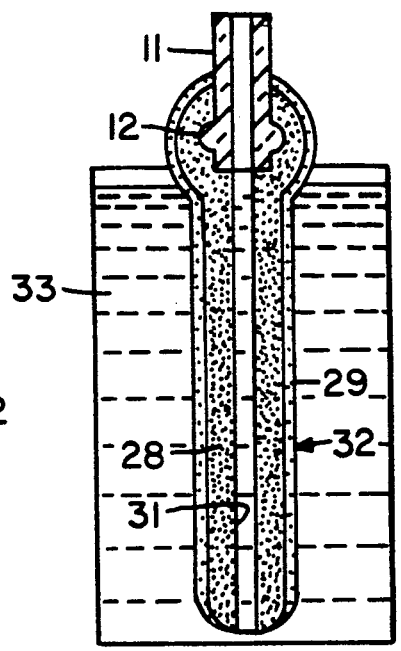

Preform 32 is immersed in solution 33 in the manner illustrated in FIG. 3 for a period of time sufficient to obtain the desired penetration of the solution into the preform pores. The immersion time required to obtain maximum dopant concentration in the preform depends upon the size and type of preform and its density. Immersion time is shortened when preforms have an axial aperture 31 since the solution can flow into the preform from the aperture as well as from the outer preform surface. For preforms having an inside diameter which tapered between 5.5 mm and 6.2 mm, an outside diameter of 43.18 mm and a density of about 0.43 g./cc, minimum immersion time was 5 hours.

Figure 4:
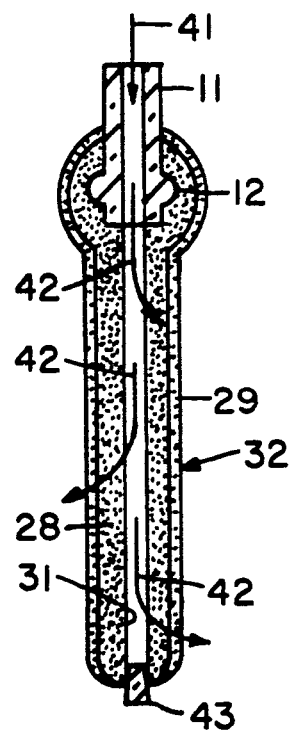
FIGS. 3 and 4 schematically illustrate two solution doping steps.

In the embodiment of FIG. 4, the solution (arrow 41) flows through tube 11 and into aperture 31. Since the end of the aperture is blocked by plug 43, the solution flows through the porous preform as illustrated by arrows 42. This method can be employed to produce a radially decreasing dopant concentration.

Figure 5:
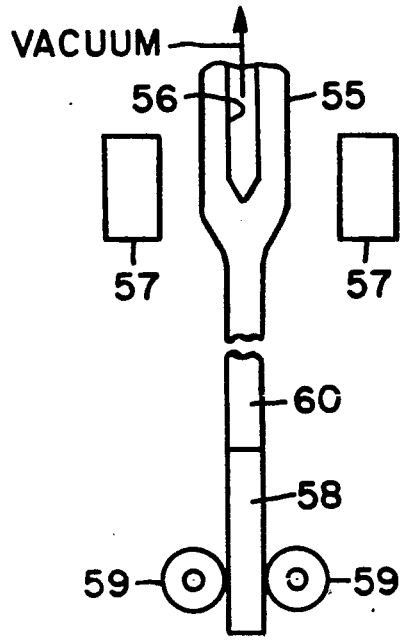
FIG. 5 is a schematic diagram illustrating the drawing of a rod from the consolidated preform.

The solvent is removed from the porous preform, which is then dehydrated and consolidated to form non-porous glassy body 55 of FIG. 5. Consolidation may be performed in accordance with the teachings of U.S. Pat. No. 4,125,388 (Powers 2A). While porous preform 32 is in the consolidation furnace muffle, a dehydrating gas such as a chlorine containing gas, is flowed through tube 11 and into preform aperture 31, and flushing gas flows upwardly through the muffle.

Consolidated preform 55 can be drawn directly into an optical fiber if the ratio of the radius of the core glass region to the overall radius is adequate to provide the desired fiber core diameter. Alternatively, preform 55 can be provided with additional cladding material prior to drawing the optical fiber. Various well known techniques are available for providing additional cladding material. For example, the consolidated preform can be inserted into a tube of cladding glass, the composite being drawn into an optical fiber.

Figure 6:
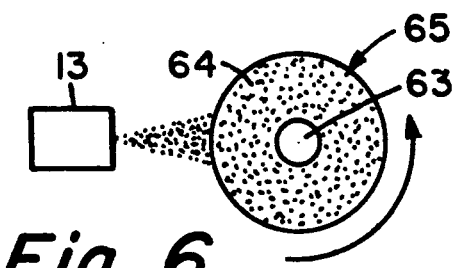
FIG. 6 illustrates the application of a coating of cladding glass particles to the rod produced by the method of FIG. 5.

In a preferred embodiment, preform 55 is inserted into the apparatus of FIG. 5 where one end of silica rod 58 is fused to the lower end of the preform, and the other end of the rod is engaged by motor-driven tractors 59. As the lower end of the preform is pulled downwardly, its diameter decreases, evacuated aperture 56 collapses, and rod 60 is drawn. A plurality of sections 63 are severed from rod 60, and each section 63 is supported in a lathe where it functions as a mandrel for the deposition of additional cladding glass particles 64 (FIG. 6) to form composite preform 65. Each composite preform is inserted into a consolidation furnace muffle where it is dehydrated and consolidated to form a draw blank that is drawn into an optical fiber.

The following specific examples illustrate the manner in which the method of the present invention can be employed to incorporate rare earth oxides into the cores of optical fibers.

Alumina mandrel 10 (FIG. 1) was inserted into glass tube 11. The outside diameter of the mandrel tapered from 5.5 mm to 6.5 mm over its 107 cm length. The ends of mandrel 10 were mounted in a lathe where it was rotated and translated. Burner 13 was positioned 11.5 cm from mandrel 10. Auxiliary burners 23 directed flames toward the ends of the porous glass preform during deposition.

The system for delivering the gas-vapor mixture to the burner was similar to that disclosed in U.S. Pat. No. 4,314,837. Liquid $SiCl_4$ was maintained at 40° C. in a first container, and liquid $GeCl_4$ was maintained at 37° C. in second container, thus producing vapor at about 20 psi. During the deposition of coatings 28 and 29 (FIGS. 1 and 2), vapors were metered from the first and second containers and were premixed with oxygen before being supplied to burner orifice 16. The burner traversed a 29 cm section of mandrel 10 in 25 seconds.

An acetylene torch supported on the burner was first employed to deposit carbon particles on the mandrel during one burner pass to facilitate removal of the porous preform. Coating 28 of silica glass particles doped with 16.8 wt. % $GeO_2$ was deposited by flowing $SiCl_4$ to burner 13 at the rate of 1.0 slpm (standard liters per minute) for 245 minutes, while $GeCl_4$ flowed to the burner at a rate of 0.65 slpm. Coating 29 was formed by flowing only 1.0 slpm $SiCl_4$ to the burner for the last 10 minutes of the run. The resultant preform was 29 cm long, 43.2 mm in diameter, and its average density was about 0.43 g./cm$^3$. The preform was cooled, and the mandrel was removed through tube 11. Preform 32 was immersed in a beaker containing 1000 ml. of solution composed of acetone in which was dissolved 0.589 gram of erbium nitrate pentahydrate. The solvent was evaporated from the Er-doped porous preform by placing it in a fume hood for one day and thereafter heating it for about 16 hours at about 90° C. The preform was then dehydrated and consolidated in accordance with the teachings of U.S. Pat. No. 4,125,388 (Powers 2A). A maximum temperature of about 1490° C. occurred in the central longitudinal region of the muffle. During the consolidation process, a gas mixture containing 26.5 sccm (standard cubic centimeters per minute) chlorine, 500 slpm helium and 50 slpm oxygen flowed into the center aperture from which the mandrel had been removed. A helium flushing gas flowed upwardly from the bottom of the muffle at a rate of 40 slpm. The preform was gradually lowered into the consolidation furnace muffle, thereby forming consolidated preform 55.

The consolidated preform was placed in a draw furnace where its aperture was evacuated. The lower end of the tubular body was heated to 1900° C. and drawn at a rate of about 15 cm/min to form a 5 mm solid glass core rod which was severed to form sections. One of the sections was supported in a lathe where it functioned as a mandrel upon which $SiO_2$ cladding soot was deposited to an outside diameter of 43.24 mm. The resultant final porous preform was gradually inserted into a consolidation furnace muffle having a maximum temperature of 1490° C. where it was consolidated to form a draw blank. During the consolidation process, a gas mixture containing 40 slpm helium, 0.5 slpm chlorine and 0.550 slpm oxygen flowed through the muffle. The draw blank was placed in a draw furnace where its tip was heated to about 2100° C., and a fiber having an outside diameter of 125 μm was drawn. The fiber was coated with a 250 μm diameter urethane acrylate coating during drawing. The effective step index radius of the fiber core was 3.2 μm. The average concentration of $Er_2O_3$ in the Er-doped region of the fiber was 310 ppm (105 ppm $Er^{3+}$).

Except for differences specified below, a process similar to that employed to form the Er-doped fiber was used to form a Yb-doped absorbing fiber suitable for use in conjunction with an erbium-doped fiber amplifier.

A porous preform having a length of about 70 cm, an outside diameter of 63.22 mm, and an average density of about 0.41 g/cc was deposited as follows. The flow of $SiCl_4$ to the burner was ramped between 2.7 and 4.15 slpm during a 263 minute period. During the first 261 minutes of that period, the flow of $GeCl_4$ to the burner was ramped between 0.24 and 0.36 slpm to form coating 28, which consisted of $SiO_2$ doped with 9.7 wt. % $GeO_2$. The thin $SiO_2$ coating 29 was deposited during the last two minutes of the run. The porous preform was cooled, removed from the mandrel and immersed in a beaker containing 1000 ml. of solution composed of acetone in which was dissolved 1 gram of ytterbium nitrate. The solvent was evaporated from the Yb-doped porous preform by placing the preform in a fume hood for four days and thereafter heating it for about 16 hours at about 90° C. The preform was then gradually inserted into a consolidation furnace muffle, where it was dehydrated and consolidated. A maximum temperature of about 1490° C. occurred in the central longitudinal region of the muffle. During this process, a gas mixture containing 70 sccm chlorine and 1200 sccm helium flowed into the center aperture while the 40 lpm helium flushing gas flowed upwardly from the bottom of the muffle.

The consolidated preform was placed in a draw furnace where its aperture was evacuated. The lower end of the tubular body was heated to about 1900° C. and drawn to form a 5 mm solid glass core rod which was severed to form sections. One of the sections was supported in a lathe where it functioned as a mandrel upon which a coating of $SiO_2$ cladding soot was deposited to an outside diameter of 53.5 mm. The resultant final porous preform was gradually inserted into a consolidation furnace muffle having a maximum temperature of about 1490° C. where it was consolidated to form a draw blank. During the consolidation process, a gas mixture containing 20 slpm helium and 200 sccm chlorine flowed through the muffle. The draw blank was drawn to form a fiber having a 125 μm outside diameter that was provided with a 250 μm diameter urethane acrylate coating. The effective step index radius of the fiber core was 8.2 μm. The average concentration of $Yb_2O_3$ in the Yb-doped region of the fiber was 870 ppm (290 ppm $Yb^{3+}$).

We claim:

1. A method of making silica-containing glass optical fiber comprising depositing heated glass particles on an exterior surface of an elongated support where they adhere together to form a porous glass preform having interconnective pores, removing said support to form a tubular porous glass body, adding dopant to said porous glass preform by flowing into the pores of said porous glass body a solution of a salt of the dopant dissolved in an organic solvent comprising, an OH-free solvent, said OH-free solvent further comprising 0–30 volume percent of an OH-containing solvent, removing the organic solvent, heat treating the porous glass preform to consolidate it into a non-porous glassy body containing the dopant dispersed through at least a portion of the body, and forming an optical fiber from said glassy body wherein the step of depositing comprises introducing one or more reactant compounds into a flame where they are oxidized to form glass particles that are deposited on said support to form said porous glass preform.

2. A method in accordance with claim 1 wherein said solution comprises a rare earth salt dissolved in said solvent.

3. A method in accordance with claim 1 wherein said solution comprises a nitrate of the dopant dissolved in said solvent.

4. A method in accordance with claim 1 wherein said organic solvent is a ketone.

5. A method in accordance with claim 1 wherein said organic solvent is acetone.

6. A method in accordance with claim 1 wherein said organic solvent is an organic solvent having no OH groups.

7. A method in accordance with claim 1 wherein the step of adding comprises dissolving said salt in an amount of OH containing organic solvent that is just sufficient to form an initial solution and thereafter adding a sufficient amount of OH-free solvent to said initial solution to form the solution in which said porous preform is immersed.

8. A method in accordance with claim 1 wherein the step of forming comprises providing said glassy body with cladding glass and drawing the resultant composite into a fiber.

9. A method in accordance with claim 8 wherein the step of providing comprises depositing cladding glass particles on said glassy body.

10. A method in accordance with claim 9 wherein the step of providing comprises stretching said glassy body to decrease its diameter prior to depositing said cladding glass particles on said glassy body.

* * * * *